（12） United States Patent
Lakshmikumaran et al.

(10) Patent No.: US 9,001,464 B2
(45) Date of Patent: Apr. 7, 2015

(54) READ/WRITE HEAD WITH IMPROVED CONTACT

(71) Applicant: Oracle International Corporation, Redwood City, CA (US)

(72) Inventors: Anand V. Lakshmikumaran, Westminster, CO (US); Joseph E. Torline, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/973,408

(22) Filed: Aug. 22, 2013

(65) Prior Publication Data

US 2015/0055244 A1  Feb. 26, 2015

(51) Int. Cl.
*G11B 5/584* (2006.01)
*G11B 5/187* (2006.01)
*G11B 5/008* (2006.01)

(52) U.S. Cl.
CPC .............. *G11B 5/1871* (2013.01); *G11B 5/008* (2013.01)

(58) Field of Classification Search
USPC ........................................................ 360/122
See application file for complete search history.

(56) References Cited

U.S. PATENT DOCUMENTS

| 5,883,770 A | 3/1999 | Biskeborn et al. |
| 6,118,626 A * | 9/2000 | Muftu et al. ................. 360/122 |
| 6,236,537 B1 * | 5/2001 | Poorman et al. ............. 360/122 |
| 2012/0183907 A1 | 7/2012 | Biskeborn et al. |

FOREIGN PATENT DOCUMENTS

WO        0237478 A2    5/2002

OTHER PUBLICATIONS

Cherubini et al., "29.5-Gb/in2 Recording Areal Density on Barium Ferrite Tape", IEEE Transactions on Magnetics, vol. 47, No. 1, Jan. 2011, pp. 137-147.
International Search Report for corresponding Application No. PCT/US2014/049333, mailed Nov. 17, 2014, 10 pages.

* cited by examiner

*Primary Examiner* — Allen T Cao
(74) *Attorney, Agent, or Firm* — Brooks Kushman P.C.

(57) ABSTRACT

A read/write head is provided with a body having a body length and a support surface to support data storage media as the data storage media is conveyed longitudinally across the support surface. The support surface of the body is curved about an axis in a widthwise direction of the elongate body. The support surface of the body has a reduced longitudinal length relative to the body length only in an intermediate region. At least one read/write device is provided on the intermediate region of the support surface of the body to read and/or write data on the data storage media as the data storage media is conveyed across the support surface. A tape drive system is provided with the read/write head, the at least one read/write device, and a motor to drive the data storage tape.

20 Claims, 5 Drawing Sheets

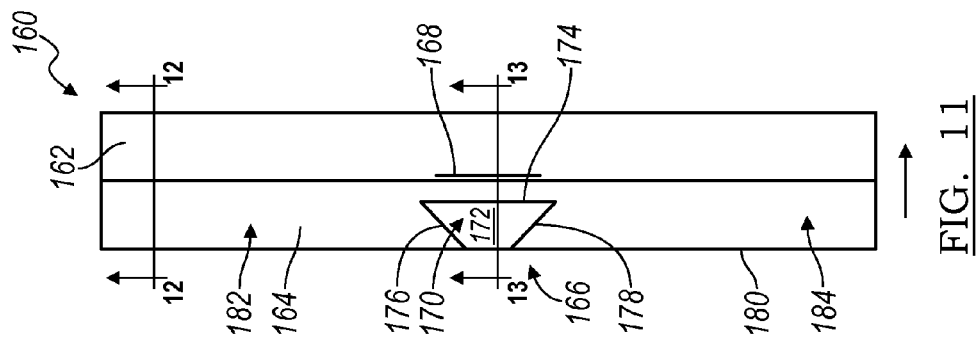
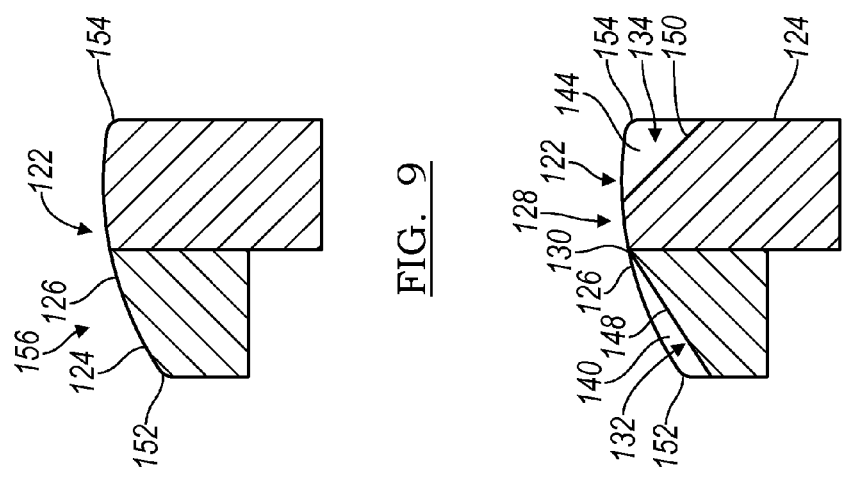
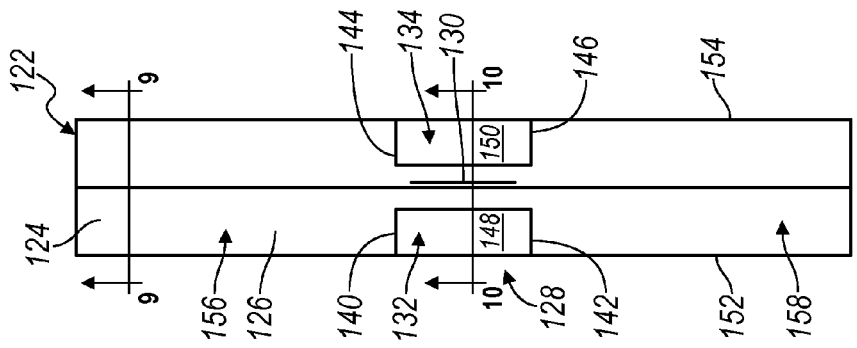

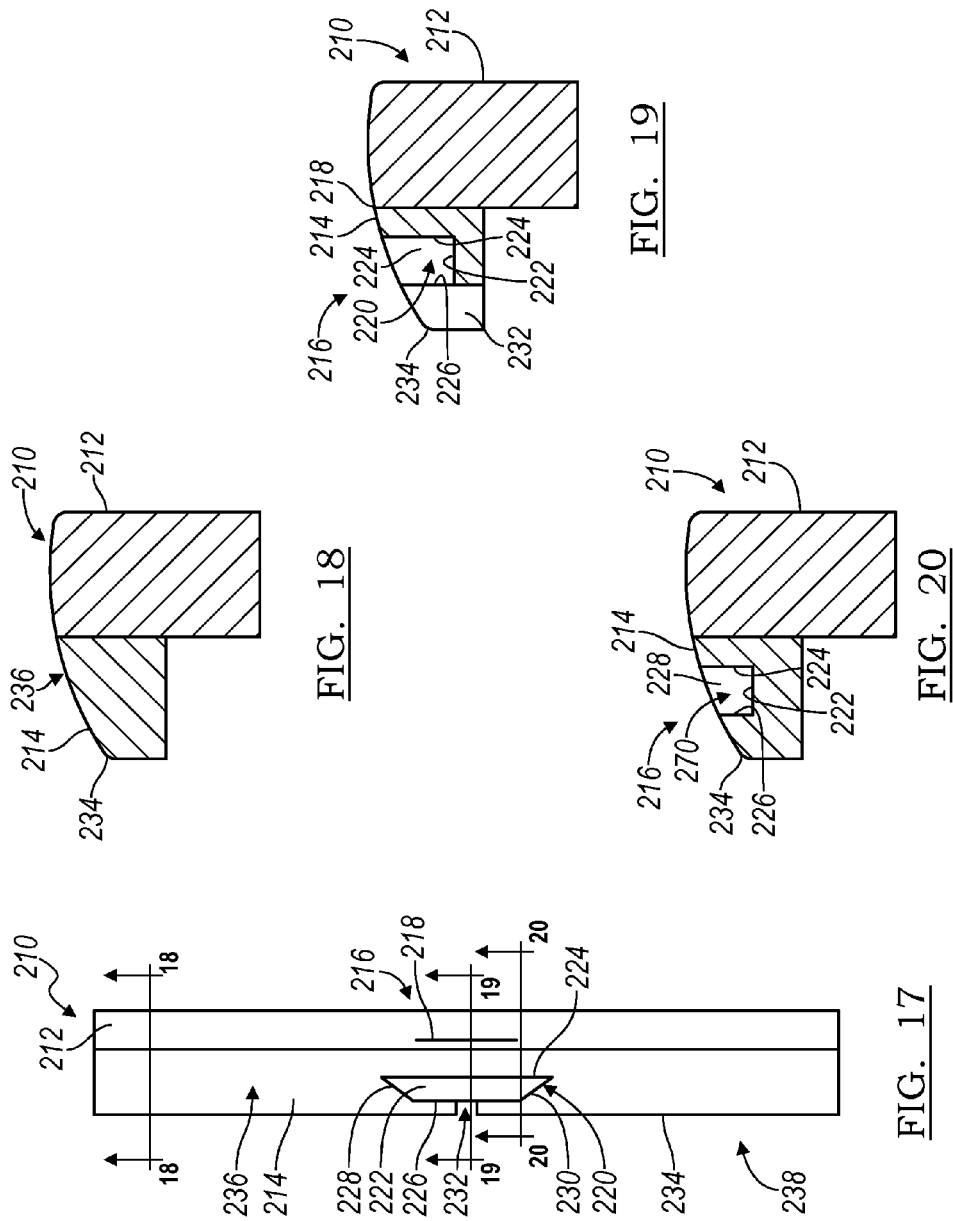

READ/WRITE HEAD WITH IMPROVED CONTACT

TECHNICAL FIELD

Various embodiments relate to read/write heads for data storage systems.

BACKGROUND

For data storage systems that utilize tape, tape heads are utilized to perform read and/or write operations upon the tape while the tape is conveyed across the tape head. A profile of the tape head in a direction of tape motion is commonly referred to as a contour. The contour is designed to maintain the moving tape in contact with a surface of the tape head, especially in a region adjacent to devices that perform the read and/or write functions. The contact of the moving tape to the surface of the tape head is to be achieved while minimizing friction between the tape head and tape to minimize wear of the tape and the tape head.

Some prior art tape heads use a cylindrical tape head surface with transverse slots across an entire width of the tape head. In the absence of the transverse slots, air is introduced between the tape and the tape head, thereby disrupting contact between the tape and the tape head. With the transverse slots, the moving tape stays in contact with the tape head downstream of the transverse slot, thus creating friction across the entire width of the tape. A wrap angle is an angle at which the tape extends from the tape head relative to a longitudinal direction of travel, wherein the tape extends from the support surface at a location that is spaced inboard from an edge of the tape head. These contours operate at large nominal wrap angles and can tolerate a large variation in wrap angle.

In other prior art tape heads, flat support surfaces with reduced lengths are used to reduce the active area of contact and thus reduce friction upon the tape and the tape head as compared to the cylindrical contours. The tape is overwrapped at the corners of the flat surfaces that are perpendicular to the longitudinal direction. The overwrap scrapes off entrained air, thus creating contact between tape and the tape head, but creates contact pressure, which consequently causes friction. An overwrap angle is an angle at which the tape extends from an edge of the tape head relative to a support surface of the tape head. In this case, the overwrap angle is the same as the wrap angle defined earlier. Higher overwrap angles create higher contact pressure and friction. So, these contours typically operate at a lower nominal wrap angle and the wrap angle variation is more precisely controlled, especially to reduce wear of the tape as larger wrap angles can lead to higher tape wear. The wrap angle (and overwrap angle) is dictated by the location of the head in the tape path of the tape drive, or more precisely, by the location of the tape path guides adjacent to the head. Typically, the head is manufactured separately and then integrated into the tape path during drive manufacturing, leading to larger variations in the wrap angles presented to the contour. In addition, heads with newer overwrapped contour designs can be installed in tape drives with tape paths designed with larger nominal wrap angles of the earlier transverse slotted cylindrical contour designs.

For these overwrapped contours, it is desired to present a low nominal wrap angle with tight tolerances to the active head contour, irrespective of the nominal wrap angle and tolerances dictated by the tape path. One current solution includes installation of additional inactive cylindrical modules (known as outriggers) onto either side of the active modules (read/write heads) such that the entire assembly (outriggers and overwrapped modules) works for any reasonable nominal wrap angle or variation from the tape path. The outriggers are designed so that there is negligible friction between the tape and the outriggers at the operational tape speed. The outriggers are assembled to the active modules such that the overwrap on the active modules is minimized to reduce friction. This approach leads to additional processes to fabricate and assemble the outriggers; and increases the physical size of the tape head assembly, which may interfere with other components in the tape drive. This issue is amplified when the size of the active tape head assembly increases due to architectural changes, such as an increase in the number of active modules used.

Another solution is to introduce mechanisms in the tape path to precisely control the wrap angle during the integration of the head assembly into the tape path during drive manufacturing. This greatly increases the process complexity for integrating the head assembly into the drive.

SUMMARY

According to at least one embodiment, a read/write head is provided with a body having a body length and a support surface to support data storage media as the data storage media is conveyed longitudinally across the support surface. The support surface of the body is curved about an axis in a widthwise direction of the elongate body. The support surface of the body has a reduced longitudinal length relative to the body length only in an intermediate region of the body. At least one read/write device is provided on the intermediate region of the support surface of the body to read and/or write data on the data storage media as the data storage media is conveyed across the support surface.

According to at least one embodiment, a tape drive system is provided with a read/write head having a length and a support surface to support data storage tape as the data storage tape is conveyed longitudinally across the support surface. The support surface of the read/write head is curved about an axis in a widthwise direction of the read/write head. The support surface of the read/write head has a reduced longitudinal length relative to the body length only in an intermediate region of the read/write head. At least one read/write device is provided on the intermediate region of the support surface of the read/write head to read and/or write data on the data storage tape as the data storage tape is conveyed across the support surface. A motor is provided to drive the data storage tape.

According to at least one embodiment, a method for manufacturing a read/write head is provided by forming an elongate body with a curved support surface to support data storage media. At least one read/write device is provided on an intermediate region of the support surface of the read/write head. Material is removed from the intermediate region of the elongate body to reduce a longitudinal length of the support surface in the intermediate region.

BRIEF DESCRIPTION OF THE DRAWINGS

FIG. 8 is a plan view of a read/write head of the tape drive system of FIG. 1, according to an embodiment;

FIG. 9 is a section view taken along section line 9-9 in FIG. 8;

FIG. 10 is a section view taken along section line 10-10 in FIG. 8;

FIG. 11 is a plan view of a read/write head of the tape drive system of FIG. 1, according to an embodiment;

FIG. 17 is a plan view of a read/write head of the tape drive system of FIG. 1, according to an embodiment;

FIG. 18 is a section view taken along section line 18-18 in FIG. 17;

FIG. 19 is a section view taken along section line 19-19 in FIG. 17; and

FIG. 20 is a section view taken along section line 20-20 in FIG. 17.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
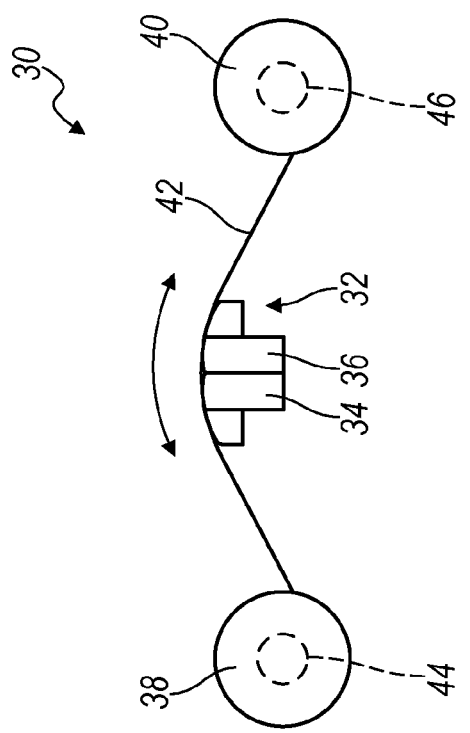
FIG. 1 is a schematic view of a tape drive system according to an embodiment.

With reference to FIG. 1, a tape drive system 30 is illustrated schematically according to an embodiment. The tape drive system 30 includes a magnetic tape read/write head assembly 32, which is depicted having two active modules 34, 36. Although two active modules 34, 36 are depicted, any number of active modules is contemplated. Inactive modules, such as outriggers have been eliminated by this arrangement, as will be explained further below. The tape drive system 30 may include one or a pair of tape reels 38, 40, which may be provided separately. The tape drive system 30 may also include a pair of guides. Magnetic tape 42 is provided upon the tape reels 38, 40. A pair of motors 44, 46 is provided for driving each of the pair of tape reels 38, 40 for bidirectional travel of the tape 42 across the tape head assembly 32 as illustrated by the arrows in FIG. 1.

Figure 2:
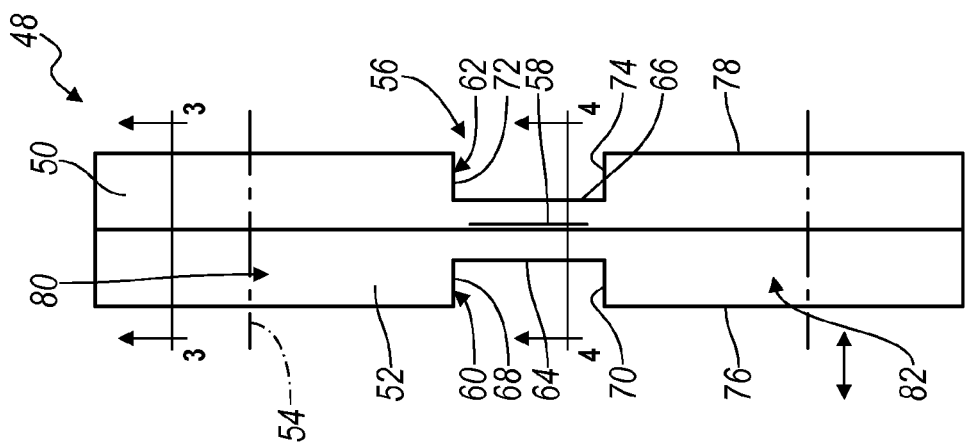
FIG. 2 is a plan view of a read/write head of the tape drive system of FIG. 1, according to an embodiment.

FIG. 2 illustrates a read/write head 48, which may be employed as one of the active modules 34, 36 of the tape head assembly 32 according to an embodiment. The read/write head 48 has a body 50 with a support surface 52 to support data storage tape 54 as the data storage media is conveyed longitudinally across the support surface 52 as depicted by the arrows in FIG. 2. The body 50 may be formed from ceramic materials. The body 50 has a length that is oriented in a longitudinal direction of tape 42 travel. The body 50 also has a width that is oriented in a direction of a width of the tape 42. For the depicted embodiment, the body 50 has a width with a greater dimension than length; however, these dimensions are named to be consistent with the naming conventions of the tape 42.

Figure 3:
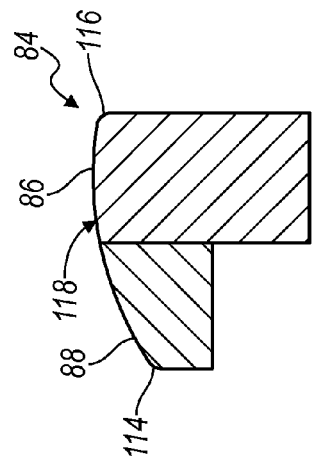
FIG. 3 is a section view taken along section line 3-3 in FIG. 2.

The support surface 52 of the body 50 is convex and curved about an axis in a widthwise direction of the body 50 as illustrated in FIG. 3. According to at least one embodiment, the support surface 52 is cylindrical about the widthwise axis. As the tape 42 travels across the support surface 52 for the length of the body 50 as illustrate in FIG. 3, a thin film of air is trapped between the tape 42 and the support surface 52 preventing physical contact and reducing friction. Such an arrangement is not applied across the entire width of the body 50, because contact is desired for performing read and/or write functions.

Figure 4:
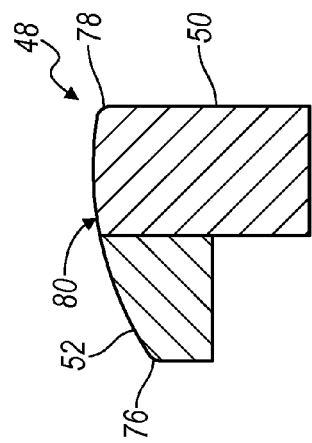
FIG. 4 is a section view taken along section line 4-4 in FIG. 2.

FIGS. 2 and 4 illustrate that the support surface 52 has a reduced longitudinal length relative to the body length in an intermediate region 56 only. The reduced longitudinal length forces contact of the tape 42 with the support surface 52 only over the intermediate region 56 and not over the entire width of the tape 42 and thus, reduces friction by not forcing contact over the entire width of the tape 42. Magnetic read/write devices 58 are provided on the intermediate region 56 of the support surface 52 of the body 50 to read and/or write data on the tape 54 as the tape 54 is conveyed across the support surface 52. Therefore, the forced contact of the tape 42 and the intermediate region 56 of the support surface 52 is provided for accurate read/write operations with the read/write devices 58. Conversely, contact is avoided on the support surface 52 outside the intermediate region 56. Although the read/write devices 58 are introduced as a plurality for each module 34, 36, it is contemplated to employ a single read/write device 58 per module.

In the depicted embodiment, the body 50 of the read/write head 48 has a reduced longitudinal length in the intermediate region 56 due to a pair of slots 60, 62 formed in the support surface 52, and through the body 50 of the read/write head 48. The slots 60, 62 are each formed generally perpendicular to a longitudinal direction of the travel of the tape 54, and perpendicular to a transverse direction, or widthwise direction of the read/write head 48. Each slot 60, 62 provides one transverse sidewall 64, 66 and two longitudinal sidewalls 68, 70, 72, 74. The transverse sidewalls 64, 66 each provide an edge with the support surface 52 to scrape air from the tape 42. Each slot 60, 62 is spaced apart from the read/write devices 58 and is formed into a longitudinal edge 76, 78 of the read/write head 48 to expose the underside of the tape 42 to ambient air to outlet air that is removed from the beneath the tape in this region 56. The slots 60, 62 improve contact in the intermediate region 56 adjacent the read/write devices 58 in each direction of travel of the tape 54. The slots 60, 62 may be formed from a material removal process such as grinding or the like.

The cylindrical module or read/write head 48 is provided with partial slots 60, 62, which are limited to the intermediate region 56, instead of spanning the width of the body 50 as provided in the prior art. The cylindrical shape provides tolerance to wrap angle variations when the head assembly 32 is integrated into the drive system 30 and limits contact of the support surface 52 of the read/write head 48 with the moving tape 54 in the intermediate region 56 of the recording devices 58. This advantage is achieved by aligning the slots 60, 62 with the read/write devices 58 in the direction of travel of the tape 54 and limiting the slots 60, 62 to the intermediate region 56, as opposed to prior art slots that span an entire width of the tape head.

By reducing the longitudinal length of the intermediate region 56, outboard regions 80, 82 of the body 50 provide the function of a prior art outrigger module on either side of the intermediate region 56, or active head contour. The function of the outboards regions 80, 82 is integrated with the overwrapped intermediate region 56 to form an integrated hybrid module 48, thereby eliminating inactive outriggers. This solution takes advantage of optimizing contact of the tape 54 to the support surface 52 to be limited in the intermediate region 56 over the location of the recording devices 58 and not the remainder of the removed head surface. With this solution all the advantages of the overwrapped contour of the prior art (reduction in air and friction) still apply in the intermediate region 56 of the read/write devices 58, while the outboard regions 80, 82 function similar to that of outriggers without requiring additional outriggers.

The hybrid module 48 is fabricated with approximately the same amount of steps as a prior art overwrapped module; but does not require any additional assembly steps during head fabrication because there are no inactive modules or outriggers to fabricate and assemble. The physical size of the tape head assembly 32 is reduced because there are no inactive modules to function as outriggers. The tape head assembly 32, by utilizing hybrid modules 34, 36 does not need to be precisely positioned with respect to the guides in the drive tape path in comparison to prior art overwrapped heads, because the hybrid modules 34, 36 of the tape head assembly 32 act as outriggers that allow for large variations in wrap angles. This solution has an added advantage of reducing the friction between the tape 54 and the head 48 by limiting contact of the tape 42 and the support surface 52 to the intermediate region 56 and avoiding contact across the entire width of the support surface 52. The wrap angles Θ, Φ (FIG. 4) are typically zero to fifteen degrees.

The pair of slots 60, 62 is provided on either side of the read/write devices 58 so that the tape 54 is in contact with the read/write devices 58 in both tape directions (bidirectional hybrid module) or on only one side of the devices 58 such that the tape is in contact with the devices 58 in only one tape direction (unidirectional hybrid module). Specific recording architectures may require the unidirectional hybrid module. Various embodiments may employ unidirectional or bidirectional tape heads, as applicable for a specific read/write function without departing from the teachings herein.

Figure 6:
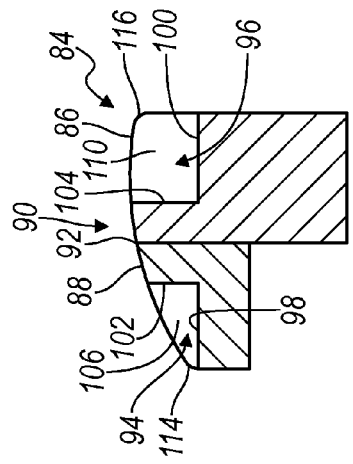
FIG. 6 is a section view taken along section line 6-6 in FIG. 5.
Figure 5:
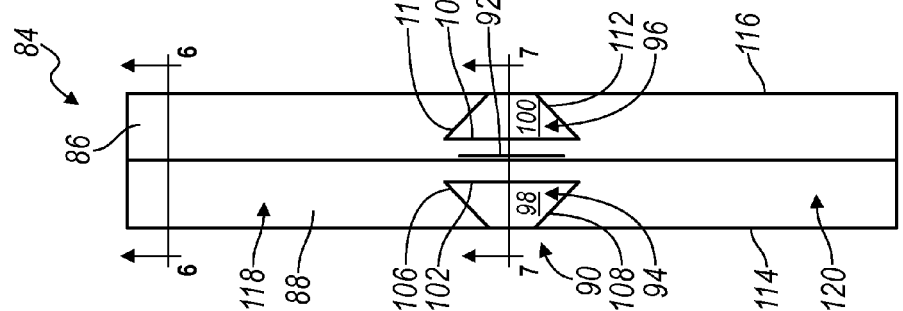
FIG. 5 is a plan view of a read/write head of the tape drive system of FIG. 1, according to an embodiment.
Figure 7:
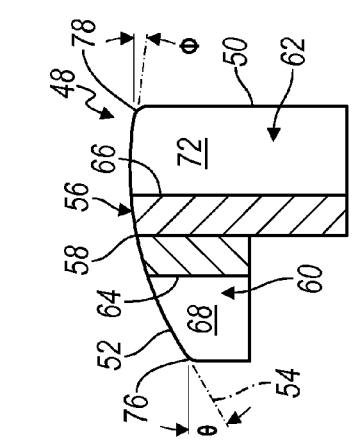
FIG. 7 is a section view taken along section line 7-7 in FIG. 5.

FIGS. 5-7 depict another bidirectional read/write head 84 embodiment with a body 86 providing a cylindrical support surface 88. An intermediate region 90 includes read/write devices 92. A pair of slots 94, 96 is each formed to a fixed depth 98, 100 in the body 86. Each slot 94, 96 provides a transverse sidewall 102, 104 and a pair of angled sidewalls 106, 108, 110, 112 that are angled relative to the transverse sidewall 102, 104 and a longitudinal direction. The blind depths 98, 100 and the angled sidewalls 106, 108, 110, 112 intersect a respective longitudinal edge 114, 116 of the read/write head 84. Similar to the prior embodiment, outboard regions 118, 120 replace the function of additional outriggers. The angled sidewalls 106, 108, 110, 112 and the blind depths 98, 100 could be formed as a continuous surface. The shape of the slots 94, 96 could be defined by a particular manufacturing process employed for providing the slots 94, 96.

FIGS. 8-10 depict yet another bidirectional read/write head 122 embodiment with a body 124 providing a cylindrical support surface 126. An intermediate region 128 includes read/write devices 130. A pair of slots 132, 134 is each formed in the body 124. Each slot 132, 134 provides a pair of longitudinal sidewalls 140, 142, 144, 146 that are angled relative to a transverse direction and a longitudinal direction. Each slot 132, 134 further provides a planar surface 148, 150 that intersects a respective longitudinal edge 152, 154 of the read/write head 122. Similar to the prior embodiments, outboard regions 156, 158 replace the function of additional outriggers.

The slots 60, 62, 94, 96, 132, 134 can be embodied in various shapes with a width that spans that of the corresponding read/write devices 58, 92, 130 to provide exposure to atmospheric pressure. Different slot shapes may be created by the use of different processes to create the slot. Some such shapes are shown in FIGS. 2-10 for bidirectional hybrid modules. Unidirectional hybrid modules are also contemplated.

Figure 12:
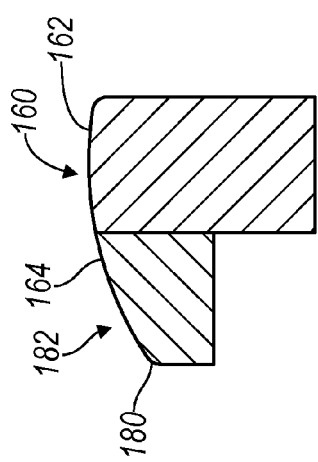
FIG. 12 is a section view taken along section line 12-12 in FIG. 11.
Figure 13:
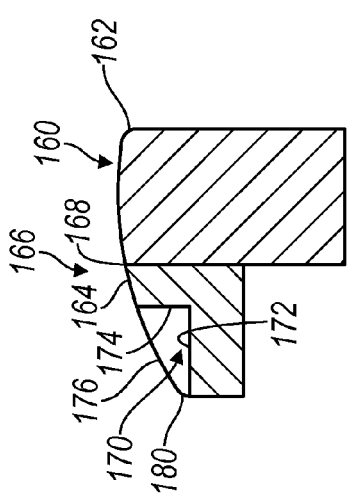
FIG. 13 is a section view taken along section line 13-13 in FIG. 11.

FIGS. 11-13 depict a unidirectional read/write head 160 embodiment with a body 162 providing a cylindrical support surface 164. An intermediate region 166 includes read/write devices 168. A slot 170 is formed to a fixed depth 172 in the body 162. The slot 170 provides a transverse sidewall 174 and a pair of angled sidewalls 176, 178, that are angled relative to the transverse sidewall 174 and a longitudinal direction. The blind depth 172 and the angled sidewalls 176, 178 intersect a longitudinal edge 180 of the read/write head 160. The angled sidewalls 176, 178 and the blind depth 172 could be formed as a continuous surface. Similar to the prior embodiments, outboard regions 182, 184 replace the function of additional outriggers.

Figure 15:
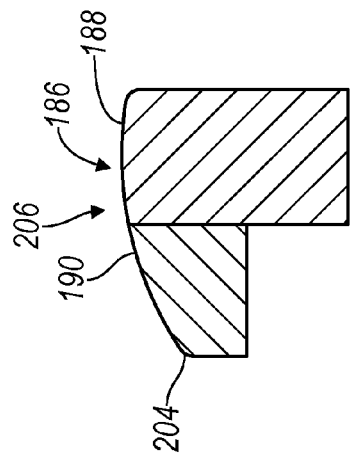
FIG. 15 is a section view taken along section line 15-15 in FIG. 14.
Figure 16:
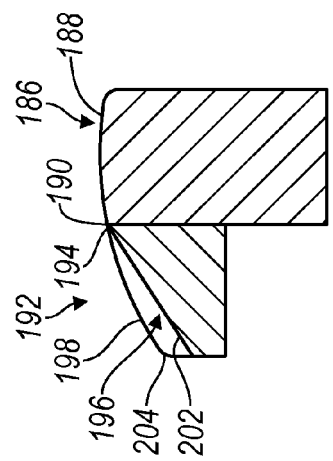
FIG. 16 is a section view taken along section line 16-16 in FIG. 14.
Figure 14:
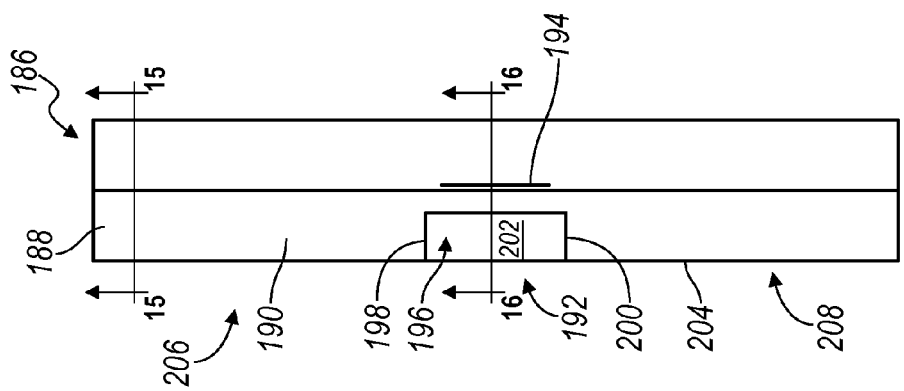
FIG. 14 is a plan view of a read/write head of the tape drive system of FIG. 1, according to an embodiment.

FIGS. 14-16 depict another unidirectional read/write head 186 embodiment with a body 188 providing a cylindrical support surface 190. An intermediate region 192 includes read/write devices 194. A slot 196 is formed in the body 188. The slot 196 provides a pair of longitudinal sidewalls 198, 200 that are angled relative to a transverse direction and a longitudinal direction. The slot 196 further provides a planar surface 202 that intersects a longitudinal edge 204 of the read/write head 186. Similar to the prior embodiments, outboard regions 206, 208 replace the function of additional outriggers.

FIGS. 17-20 depict yet another unidirectional read/write head 210 embodiment with a body 212 providing a cylindrical support surface 214. An intermediate region 216 includes read/write devices 218. A slot 220 is formed to a fixed depth 222 in the body 212. The slot 220 provides a pair of transverse sidewalls 224, 226 and a pair of angled sidewalls 228, 230, that are angled relative to the transverse sidewalls 224, 226 and a longitudinal direction. A second slot 232 intersects a longitudinal edge 234 of the read/write head 160 and the transverse sidewall 226 for exposure to atmospheric pressures. Similar to the prior embodiments, outboard regions 236, 238 replace the function of additional outriggers. A duplication of geometries can be employed for obtaining a bidirectional read/write head. The sidewalls 224, 226, 228, 230 could also be formed as a continuous surface. The transverse sidewalls 224, 226 and the angled sidewalls 228, 230 are an example of geometries resulting from the addition of the slot 220.

The various embodiments reduce the quantity of separate components that need to be fabricated and assembled during the head manufacturing process. As a result, it reduces the physical size of the head, allowing easier integration of the head into the tape drive system. This solution also provides flexibility to set the wrap angle during the integration of the head in the tape path during drive manufacture. Together, this solution produces less expensive head assemblies and consequently, less expensive drive systems.

The various embodiments facilitate a less expensive head (and therefore a less expensive tape drive system) without compromising contour performance requirements. By reducing the head-tape friction, use of smoother tapes (for higher linear recording densities) is permitted, essentially increasing tape cartridge capacities.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A read/write head comprising:
    a body having a body length and a support surface to support data storage media as the data storage media is conveyed longitudinally across the support surface, wherein the support surface of the body is curved about an axis in a widthwise direction of the body, and wherein the support surface of the body has a reduced longitudinal length relative to the body length only in an intermediate region of the body; and
    at least one read/write device provided on the intermediate region of the support surface of the body to read and/or write data on the data storage media as the data storage media is conveyed across the support surface.

2. The read/write head of claim 1 wherein the support surface of the body is convex about the widthwise axis.

3. The read/write head of claim 1 wherein the support surface of the body is partially cylindrical about the widthwise axis.

4. The read/write head of claim 1 wherein a slot is formed in the support surface of the body of the read/write head.

5. The read/write head of claim 4 wherein the slot is formed through the body of the read/write head.

6. The read/write head of claim 4 wherein the slot is formed generally perpendicular to a longitudinal direction and a transverse direction.

7. The read/write head of claim 4 wherein the slot provides one transverse sidewall and two longitudinal sidewalls.

8. The read/write head of claim 4 wherein the slot provides one transverse sidewall and two sidewalls that are angled relative to the transverse sidewall and a longitudinal direction.

9. The read/write head of claim 4 wherein the slot provides two longitudinal sidewalls and a generally planar transverse surface.

10. The read/write head of claim 4 wherein the slot is formed to a fixed depth in the body.

11. The read/write head of claim 10 wherein the slot is further defined as a first slot; and
    wherein a second slot is formed in the body of the read/write head intersecting the first slot.

12. The read/write head of claim 4 wherein the slot is spaced apart from the at least one read/write device and is formed into a longitudinal edge of the body.

13. The read/write head of claim 12 wherein a second slot is formed in the support surface of the body of the read/write head to improve contact during travel of the data storage media in a reverse longitudinal direction.

14. The read/write head of claim 13 wherein the second slot is spaced apart from the at least one read/write device and spaced apart from the first slot, and the second slot is formed into a second longitudinal edge of the read/write head.

15. A tape drive system comprising:
    a read/write head having a length and a support surface to support data storage tape as the data storage tape is conveyed longitudinally across the support surface, wherein the support surface of the read/write head is curved about an axis in a widthwise direction of the read/write head, and wherein the support surface of the read/write head has a reduced longitudinal length relative to the body length only in an intermediate region of the read/write head;
    at least one read/write device provided on the intermediate region of the support surface of the read/write head to read and/or write data on the data storage tape as the data storage tape is conveyed across the support surface; and
    a motor to drive the data storage tape.

16. The tape drive system of claim 15 wherein a first slot is formed in the support surface of the read/write head, spaced apart from the at least one read/write device, and formed into a longitudinal edge of the read/write head;
    wherein a second slot formed in the support surface of the read/write head, spaced apart from the at least one read/write device and spaced apart from the first slot, and the second slot is formed into a second longitudinal edge of the read/write head; and
    wherein the motor is configured to drive the data storage tape bidirectionally.

17. The tape drive system of claim 15 further comprising a pair of guides to guide the data storage tape across the read/write head.

18. A method for manufacturing a read/write head, comprising:
    forming an elongate body with a curved support surface to support data storage media;
    providing at least one read/write device on an intermediate region of the support surface of the read/write head; and
    removing material from the intermediate region of the elongate body to reduce a longitudinal length of the support surface in the intermediate region.

19. The method of claim 18 further comprising a step of removing material from the intermediate region of the elongate body at two spaced apart ends of the elongate body.

20. The method of claim 18 further comprising a step of installing the read/write head into a tape drive system.

* * * * *